July 28, 1970   G. A. BEAUDRY   3,521,741
PLANT CONTAINER
Filed June 4, 1968   2 Sheets-Sheet 1
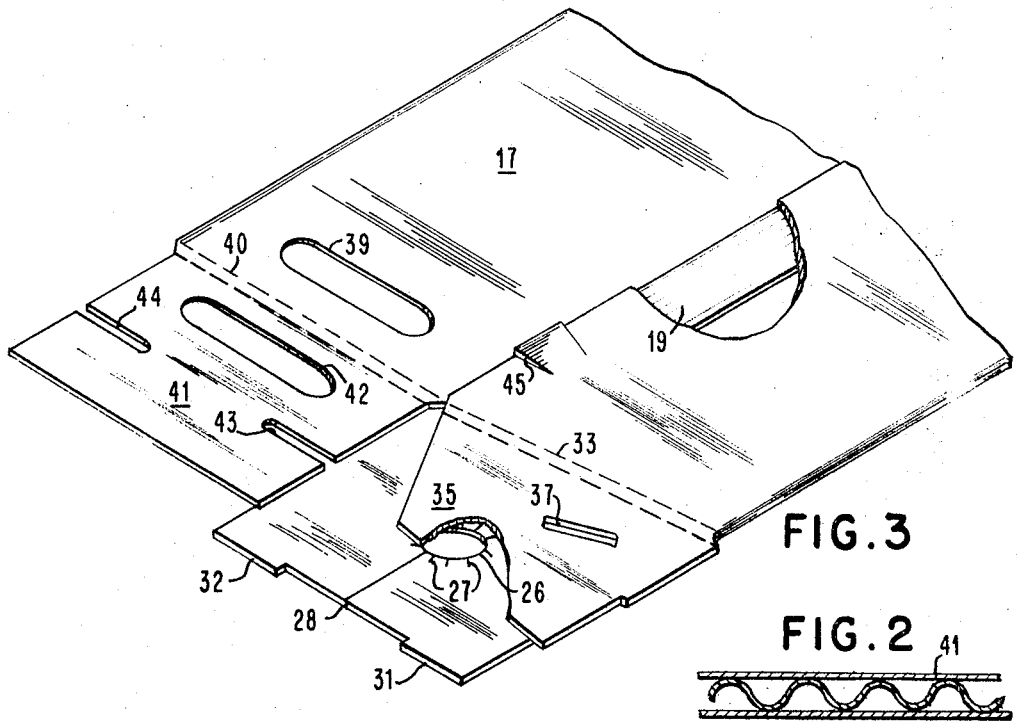
FIG. 3
FIG. 2
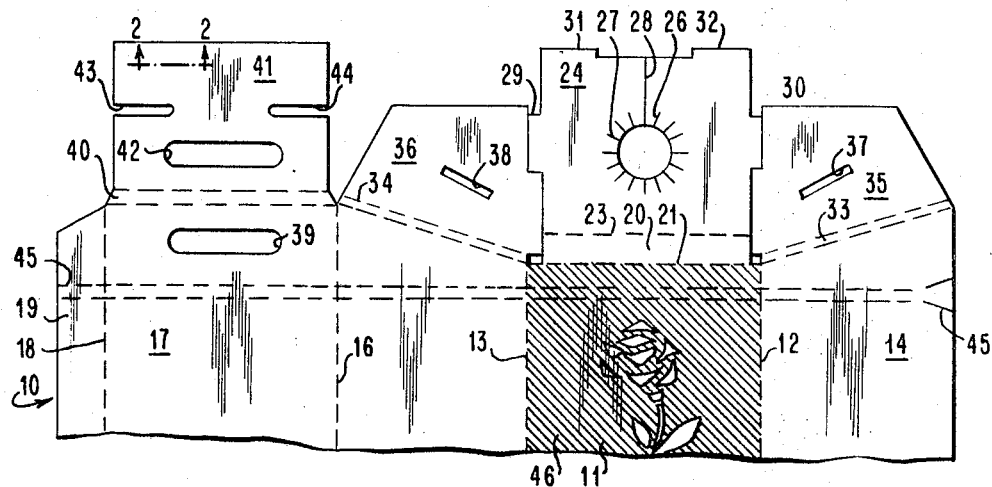
FIG. 1
GERALD A. BEAUDRY
INVENTOR.
BY *Walt Thomas Zielinski*
ATTORNEY July 28, 1970  G. A. BEAUDRY  3,521,741
PLANT CONTAINER
Filed June 4, 1968 2 Sheets-Sheet 2
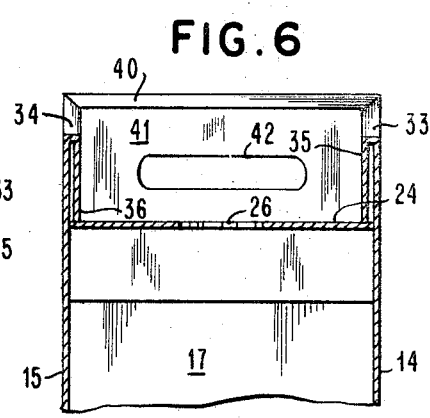
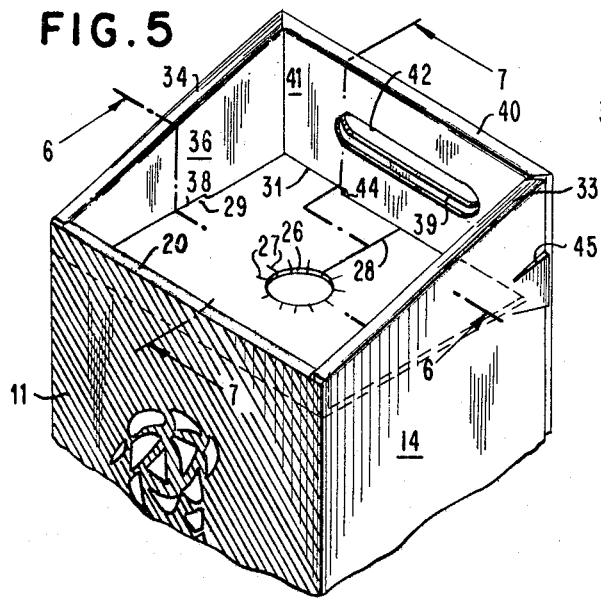
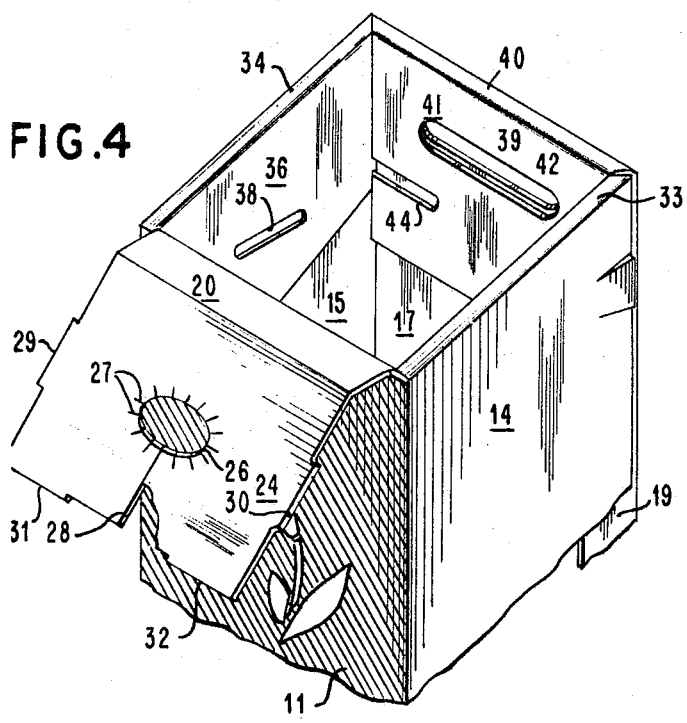
GERALD A. BEAUDRY
*INVENTOR.*
BY *Walt Thomas Zielinski*
ATTORNEY United States Patent Office 3,521,741
Patented July 28, 1970

3,521,741
PLANT CONTAINER
Gerald A. Beaudry, Geneva, N.Y., assignor to International Paper Company, New York, N.Y., a corporation of New York
Filed June 4, 1968, Ser. No. 734,318
Int. Cl. B25d 5/50
U.S. Cl. 206—45.14                16 Claims

ABSTRACT OF THE DISCLOSURE

A receptacle in which rose bushes, shrubs, and the like can be stored, transported, and planted in the ground and having the characteristics of resistance to decomposition in the presence of moisture during storage, resistance to attack by fungi while in storage, and the ability to decompose when planted in the ground sufficiently quickly to permit healthy development of the plant root systems.

---

The present invention relates to packaging for rose bushes and nursery shrubs or the like. More particularly, it relates to boxes or trays in which nursery men can place young rose bushes and shrubs for storage and later sale to ultimate customers bushes for such plants and which the customers can plant in the earth without separation from such plants.

Plantable containers of various types of plant life are well-known in the art. For instance, it is known to transport and plant rose bushes contained in foil-laminated, spiral-wound fiber or paper cans or in resin-impregnated and reinforced molded paper pulp pots. But these containers have usually suffered from at least two disadvantages. On the one hand, they tend to decompose prematurely when stored in humid or wet surroundings (in anticipation of the coming growing season), particularly because such storage frequently involves attacks on the container materials by various fungi. On the other hand, if they survive such storage, then tend to decompose inadequately when planted, because of the presence of the foil or resin, and choke the root systems of the bushes contained therein.

It is an object of the present invention to overcome the disadvantages heretofore experienced in the field of plantable containers. It is an object of the present invention to provide a suitable, portable container for plants which has a resistance to untimely decomposition due to wetness and fungal attack and which decomposes completely at the appropriate time to permit healthy root system development for the plant it carries from nursery to gardener. It is also an object of the present invention to provide a suitable packaging material from which plantable containers having the desired properties can be made in various shapes or designs.

For a better understanding of the present invention, reference should be had to the attached drawings wherein:

FIG. 1 is a plan view of a major portion of a blank for a container made in accordance with the present invention;

FIG. 2 is a sectional view of the blank of FIG. 1, taken along line 2—2;

FIG. 3 is an isometric view of the blank of FIG. 1 partially folded and provided with a manufacturer's joint;

FIG. 4 is an isometric view of the upper end of an open container formed by the erection of the blank of FIG. 1;

FIG. 5 is an isometric view of the upper end of a closed container formed by the erection of the blank of FIG. 1;

FIG. 6 is a sectional view of the container of FIG. 5, taken along line 6—6; and, FIG. 7 is a sectional view of the container of FIG. 5, taken along line 7—7.

Referring to FIG. 1, the upper end of a rectangular container blank 10 die cut from single wall, double face corrugated paperboard (such as is illustrated in FIG. 2) or a comparable material is provided with a front panel 11 which is hingedly connected along vertical fold or score lines 12 and 13 to side panels 14 and 15, respectively. In turn, side panel 15 is hingedly connected along vertical fold or score line 16 to back panel 17 and back panel 17 is hingedly connected along vertical fold or score line 18 to glue flap 19. The lower end of container blank 10 is not shown for the reason that it is ordinarily comprised of, in addition to the lower ends of panels 11, 14, 15, and 17 and flap 19, conventional container bottom closing flaps which can be glued, stitched, taped, interlocked, or otherwise fashioned into typical receptacle bottom closure means.

Still referring to FIG. 1, the upper end of container blank 10 also includes shoulder panel 20 hingedly connected along fold or score line 21 to front panel 11; and, cover flap 24 hingedly connected along fold or score line 23 to shoulder panel 20. It will be seen too that cover flap 24 is provided with means defining a circular hole 26 centrally thereof, a series of small cuts 27 extending radially from the center of such hole in a so-called sunburst pattern, a vertical cut 28 extending radially from the perimeter of such hole to the upper edge of cover panel 24. Again, cover flap 24 is provided with side tabs 29 and 30 and end tongues 31 and 32.

As shown in FIG. 1, side panels 14 and 15 are hingedly connected along angled double fold or score lines 33 and 34, respectively, to side flaps 35 and 36, respectively. It is to be noted that fold lines 33 and 34 are both disposed at identical acute angles with respect to cover panel 24. They are also provided with angled tab receiving means 37 and 38, respectively. In turn, back panel 17 is provided with means defining a first handle opening 39 and is hingedly connected along horizontal double score or fold line 40 to handle flap 41. It will be noted that score line 40 lies so that one end thereof virtually meets an end of angled score line 34. Handle flap 41 is provided with second handle opening defining means 42 and tongue receiving means 43 and 44.

FIG. 1 also depicts the incorporation in container blank 10 of container severing means 45 which can consist of a tear strip produced by parallel lines of weakness disposed laterally across the blank or, preferably, a commercially available tear tape similarly disposed and glued to the interior surface of the container made from the blank plus means disposed along one side of the blank enabling a manual tearing of the container material with the assistance of the tear tape. Again, printed indicia 46 are shown on blank 10 both to emphasize the capability of the container of the present invention to carry instructions or other messages from the seller to the buyer thereof and to call attention to the character of such printing as a structural element in a preferred embodiment of such container, as will be discussed further herein.

FIG. 2 shows a preferred embodiment of the material from which container blank 10 of the present invention can be made. This material is variously called corrugated paperboard or corrugated fiberboard or combined board and is comprised of two facing sheets made from linerboard (i.e., a paperboard particularly adapted to such end use) between which is sandwiched and glued a fluted wall or layer of corrugating medium (i.e., a paper particularly adapted to such end use). For purposes of convenience let it be assumed that the upper layer of the depicted material is the outer surface of blank 10 and the container made therefrom and that the lower layer of the depicted material is the inner surface of blank 10 and the container made therefrom.

FIG. 3 depicts the partial folding of blank 10, and the joinder of side panel 14 and glue flap 19 thereof with the aid of a waterproof conventional adhesive or other fastening means to produce a so-called manufacturer's joint. The resulting unit is, generally, what is shipped by the container manufacturer to the customer therefor, who then erects, fills, and closes the container.

FIGS. 4 and 5 show the fully erected container derived from blank 10 open at the top in the first instance and closed at the top in the second. It will be seen that front panel 11 is disposed substantially perpendicularly to side panels 14 and 15 along score lines 12 and 13, respectively, and substantially parallelly to back panel 17 to form a receptacle of substantially rectangular cross-section. Thereafter, side flaps 35 and 36 are folded into such receptacle and substantially parallelly to side panels 14 and 15, respectively, along angled score lines 33 and 34, respectively, and handle flap 41 is similarly folded into the receptacle along score line 40 to lie tightly between side flaps 35 and 36 and substantially parallelly to back panel 17. It will be seen that the disposition of flaps 35, 36, and 41 in this manner affords the upper end of the container yielded by blank 10 added strength and rigidity. This added strength and rigidity is particularly advantageous in connection with the handle portion of the container which results from having first handle opening means 39 of back panel 17 overlie and in registry with second handle opening means 42 of handle flap 41.

The container of FIG. 4 is in readiness to receive, for instance, a young rose bush and a mixture of potting materials (not shown) comprised of, for example, peatmoss, vermiculite, sphagnum moss, and water. This mixture is commonly machine-blown into the container at about 80 lbs. of pressure.

Once the bush and potting materials just described are placed in the container erected from blank 10, cover flap 24 is raised from its position in FIG. 4; opened or separated along cut 28 to enable movement of one half of such flap past the upstanding limbs or branches of the bush on either side thereof and to enable the disposition of such limbs or branches in hole 26 of cover flap 24; and, lowered into the container with appropriate folding along score line 23 until side tabs 29 and 30 of cover flap 24 are disposed in tab receiving means 38 and 37, respectively, of side flaps 36 and 35, respectively, and until end tongues 31 and 32 of cover flap 24 are disposed in tongue receiving means 44 and 43, respectively, of handle flap 41. The folding along score line 23 enables shoulder panel 20 to take its place in the construction of a strong and rigid protective top for the subject containers which is, in addition, adequately recessed from the uppermost portions of the container to form a temporary catch basin for water sprayed on the boxed rose bush, etc., during storage. Ultimately, of course, such water flows out of such basin through hole 26 in cover flap into the potting material surrounding the lower elements of the rose bush.

When containers of the present invention are made of corrugated paperboard comprised of, for instance, 62 lbs. Hydrokraft linerboard on the outer surface, 33 lbs. Hydrochem corrugating medium (with or without wax impregnation), and 62 lbs. Hydrokraft linerboard on the inner surface combined with conventional waterproof adhesive, they are capable of withstanding the rigors of short storage times, transportation, and planting without further augmentation. But, if they are asked for the sake of their contents to withstand longer storage periods of, say, three to five months at low temperatures and high humidity, e.g., 28° F. to 29° F. and 85% relative humidity, more has to be done in their preparation. This is particularly true if they are printed with oil-base inks in the first instance, because such inks promote the growth of certain fungi which attack the containers and are generally present in cold storage environments. Included in such fungi are species of pencillium and aspergillus.

Means have now been found to provide the containers of the present invention and the corrugated paperboard from which they are preferably made with adequate resistance to the aforementioned cold storage hazards of cold, humidity, and fungi. It has been found that a coating of a mixture of about 5 to 7.5 lbs. of 35% active dodecycle guanidine concentrate (available commercially under the name "100 p.p.m. Cosan D.G.") with 50 gallons of water, which coating is applied at a rate of about 0.38 to 0.548 gallon per 1000 square feet by gravity feed to the outer surface of the corrugated paperboard during the manufacture thereof on a conventional corrugator, contributes marked improvement in the resistance of the paperboard to such hazards.

It has also been found that a further improvement in the resistance of the paperboard to cold storage deterioration can be secured by adding about 45 grams of a 4% concentrate of sodium salt of ortho phenyl phenate to every 25 lbs. of oil-based inks used in printing such paperboard. Preferably, such inks should be reground at least four times to assure even distribution of this additive.

When the containers of the present invention and their contents come out of cold storage and are sold to professional or amateur gardeners, they lend themselves easily to both transportation and planting. Their handle portions make small work of the transportation and their planting entails little more than a suitable hole in the ground, insertion of the container therein, utilization of container severing means 45 to separate the top structure of the container from the lower buried portions thereof, a lifting of cover flap 24 from about the rose bush limbs or branches, and a lifting off of the top structure. The rest of the container which is left in the ground will decompose, due to acid soil and bacterial conditions, in good time to allow the untrammeled development of the rose bush root system even if it includes one or both of the aforementioned fungicides. Such decomposition should be substantially complete in about nine weeks, as an average.

What is claimed is:

1. A blank of sheet material for folding into a container having a front panel, side panels, a back panel, and bottom closure means comprising a front panel, side panels hingedly connected along vertical score lines to the front panel, a back panel hingedly connected along a vertical score line to one of said side panels, a glue flap hingedly connected along a vertical score line to the back panel, a first handle opening defining means in the back panel, a shoulder panel hingedly connected along a horizontal score line to the front panel, a cover flap hingedly connected along a horizontal score line to the shoulder panel, hole defining means disposed centrally in the cover flap, cut defining means in the cover flap extending from the hole therein to the outer edge thereof, tabs disposed along the cover flap sides, tongues disposed along the cover flap outer edge, side flaps hingedly connected along angled score lines to the side panels, tab receiving means disposed in the side flaps, a handle flap hingedly connected along a horizontal score line to the back panel, second handle opening defining means in the handle flap, and tongue receiving means disposed in the handle flap.

2. The blank of claim 1 wherein the sheet material is corrugated paperboard.

3. The blank of claim 2 wherein the corrugated paperboard is coated on one surface with a fungicide.

4. The blank of claim 3 wherein the fungicide is dodecycle guanidine.

5. The blank of claim 2 wherein the corrugated paperboard has indicia printed on one surface in an oil base ink.

6. The blank of claim 5 wherein the ink contains a fungicide.

7. The blank of claim 6 wherein the fungicide is a sodium salt of ortho phenyl phenate.

8. The blank of claim 2 wherein the corrugated paperboard is coated on one surface with dodecycle guanidine and has indicia printed on said one surface in an oil-base ink containing a sodium salt of ortho phenyl phenate.

9. The blank of claim 8 wherein about 5 to 7.5 lbs. of 35% active dodecycle guanidine concentrate is mixed with 50 gallons of water and applied to said one surface at a rate of about 0.38 to 0.548 gallon per 1000 square feet of surface area.

10. The blank of claim 8 wherein the oil-base ink contains about 45 grams of the sodium salt of ortho phenyl phenate per 25 lbs. of oil-base ink.

11. A container having a front panel, side panels, a back panel, and bottom closure means produced from a rectangular blank of sheet material comprising a front panel, side panels hingedly connected along vertical score lines to the front panel and disposed perpendicularly thereto, a back panel hingedly connected along a vertical score line to one of said side panels and disposed perpendicularly thereto, a glue flap hingedly connected along a vertical score line to the back panel and disposed perpendicularly thereto and fastened to the other of said side panels, a first handle opening defining means in the back panel, a shoulder panel hingedly connected along a horizontal score line to the front panel and disposed laterally therefrom, a cover flap hingedly connected along a horizontal score line to the shoulder panel and disposed laterally therefrom, hole defining means disposed centrally in the cover flap, cut defining means in the cover flap extending from the hole therein to the outer edge thereof, tabs disposed along the cover flap sides, tongues disposed along the cover flap outer edge, side flaps hingedly connected along angled score lines to the side panels and disposed parallelly thereto, tab receiving means disposed in the side flaps and having said tabs disposed therein, a handle flap hingedly connected along a horizontal score line to the back panel and disposed parallelly thereto, second handle opening defining means in the handle flap and disposed in registry with said first handle opening defining means, and tongue receiving means disposed in the handle flaps and having said tongues disposed therein.

12. The container of claim 11 wherein the sheet material is corrugated paperboard.

13. The container of claim 11 wherein the container is coated on its outer surface with a fungicide.

14. The container of claim 13 wherein the fungicide is dodecycle guanidine.

15. The container of claim 11 wherein the container has indicia printed on its outer surface in an oil-base ink containing a fungicide.

16. The container of claim 15 wherein the fungicide is a sodium salt of ortho phenyl phenate.

References Cited

UNITED STATES PATENTS

| 1,284,817 | 11/1918 | Tinsley | 229—37 |
| 1,352,759 | 9/1920 | Markert. | |
| 1,856,729 | 5/1932 | Robinson | 229—52 |
| 2,979,410 | 4/1961 | Parlour. | |
| 3,021,046 | 2/1962 | Pullen | 286—46 X |
| 3,027,684 | 4/1962 | Keiding. | |

MARTHA L. RICE, Primary Examiner

U.S. Cl. X.R.

206—46; 229—3.5, 37, 52